United States Patent Office 3,056,239
Patented Oct. 2, 1962

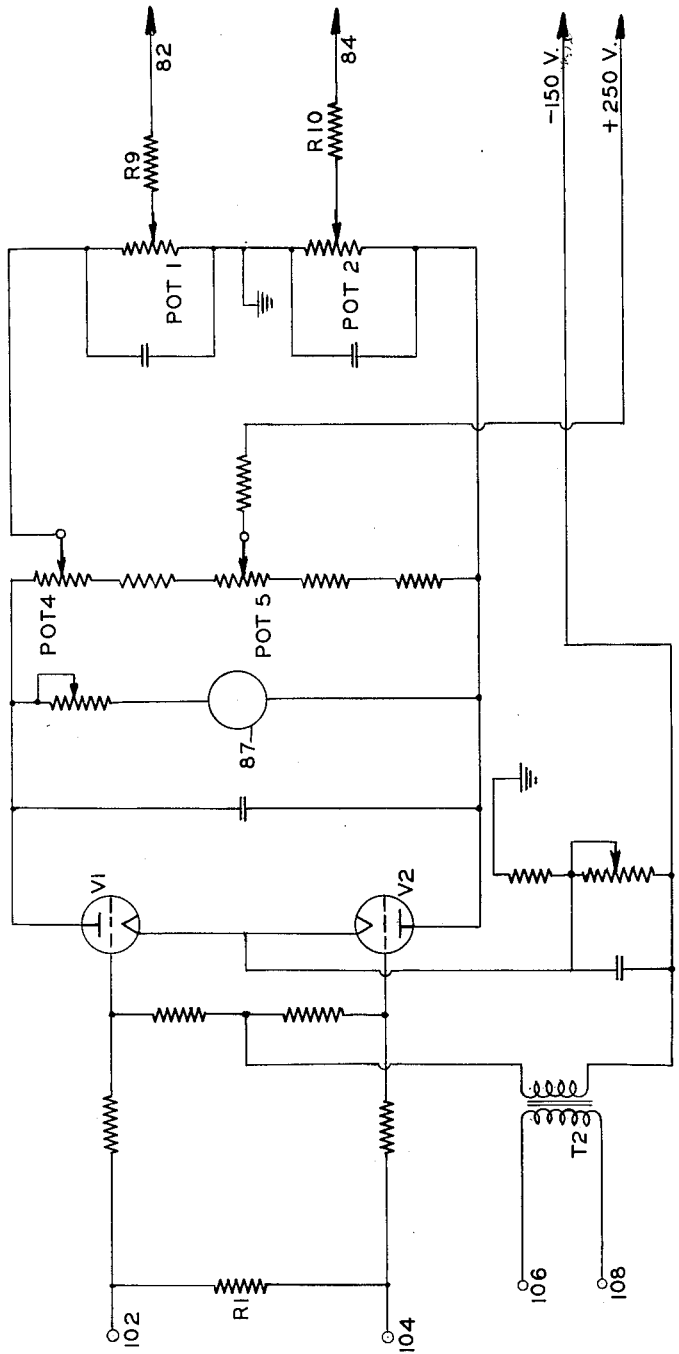

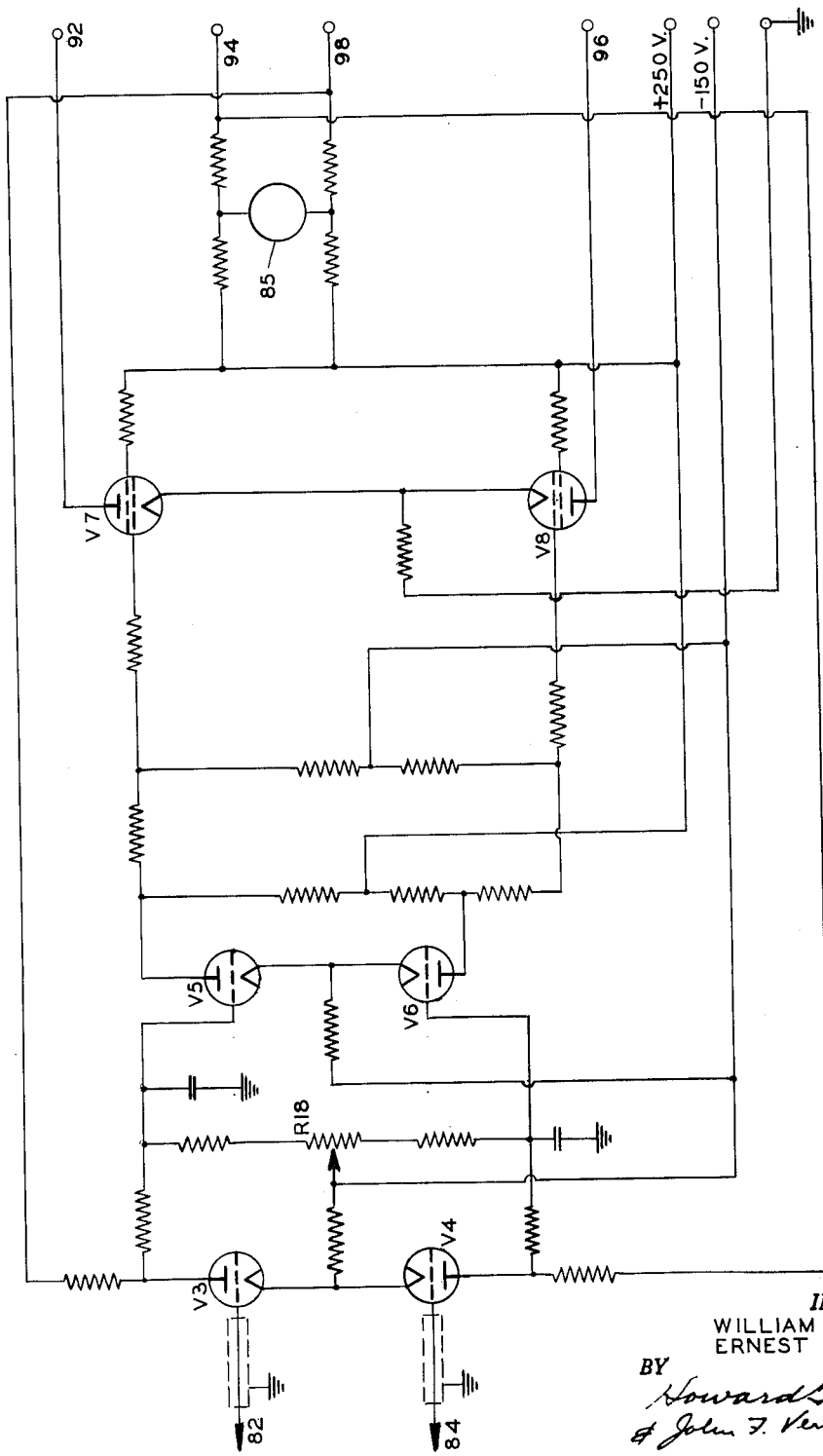

3,056,239
GRINDING WHEEL FEED MECHANISM RESPONSIVE TO PRESSURE OF WHEEL ON WORK
William B. Seidel, Cincinnati, Ohio, and Ernest Gosney, Jr., Mentor, Ky., assignors to The Cincinnati Milling Machine Company, Cincinnati, Ohio, a corporation of Ohio
Filed May 23, 1960, Ser. No. 30,795
4 Claims. (Cl. 51—165)

This invention relates to a machine tool infeed mechanism and is particularly suited for use in a precision grinding operation.

There is a relationship between quality of finish of a ground surface and the rate of grinding wheel infeed relative to that surface which directly affects the efficiency of machine operation. The rate of stock removal for a given infeed rate is a variable factor depending in part on grinding wheel cutting surface conditions. As the wheel is used, the cutting surface tends to dull and increased pressure tends to build up between wheel and workpiece which causes heating of the workpiece as well as elastic deformation of the workpiece and machine. Under these conditions, finished workpiece size tends to vary and the quality of the ground surface is not constant. Because of this, it is standard practice to decrease the rate of infeed to compensate for wheel dulling, but generally this is done only in steps at predetermined times. When the infeed rate is changed only in steps, efficiency is sacrificed since the selected infeed rate of each step will not be the optimum rate for the continuously varying grinding conditions.

In the present invention the rate of infeed is controlled in accordance with the grinding conditions, automatically, during the grinding operation. An infeed mechanism that is sensitive to changes in grinding conditions provides a variable infeed rate compatible with changing grinding conditions. This insures that efficiency of the grinding operation remains at the best level at all times. Constant changes in setting of machine variables by an operator are avoided and machine automation is facilitated.

An object of this invention is to provide an infeed mechanism to automatically produce a constantly controlled infeed rate dependent upon the cutting conditions between grinding wheel and workpiece.

Another object is to provide an infeed control system which does not require constant operator attention and is particularly adaptable to automation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In brief, a feed rate control system is provided that is dependent upon grinding conditions, particularly the pressure between the cutting surface and a workpiece. The pressure is dependent upon the resistance to stock removal encountered by the cutting surface and is directly related to the cutting surface sharpness and infeed rate. This pressure is directly reflected as the load that the cutting wheel drive motor feels. Means are employed to detect the loading of the drive motor and to produce a signal dependent upon that load which is used to control the rate of the infeed. This produces a substantially constant load level which maintains a substantially constant pressure between wheel and workpiece.

The following detailed description together with the attached drawings will furnish a clear understanding of the invention.

FIGS. 5 and 6 are schematic representations of the electronic unit components.

Figure 1:
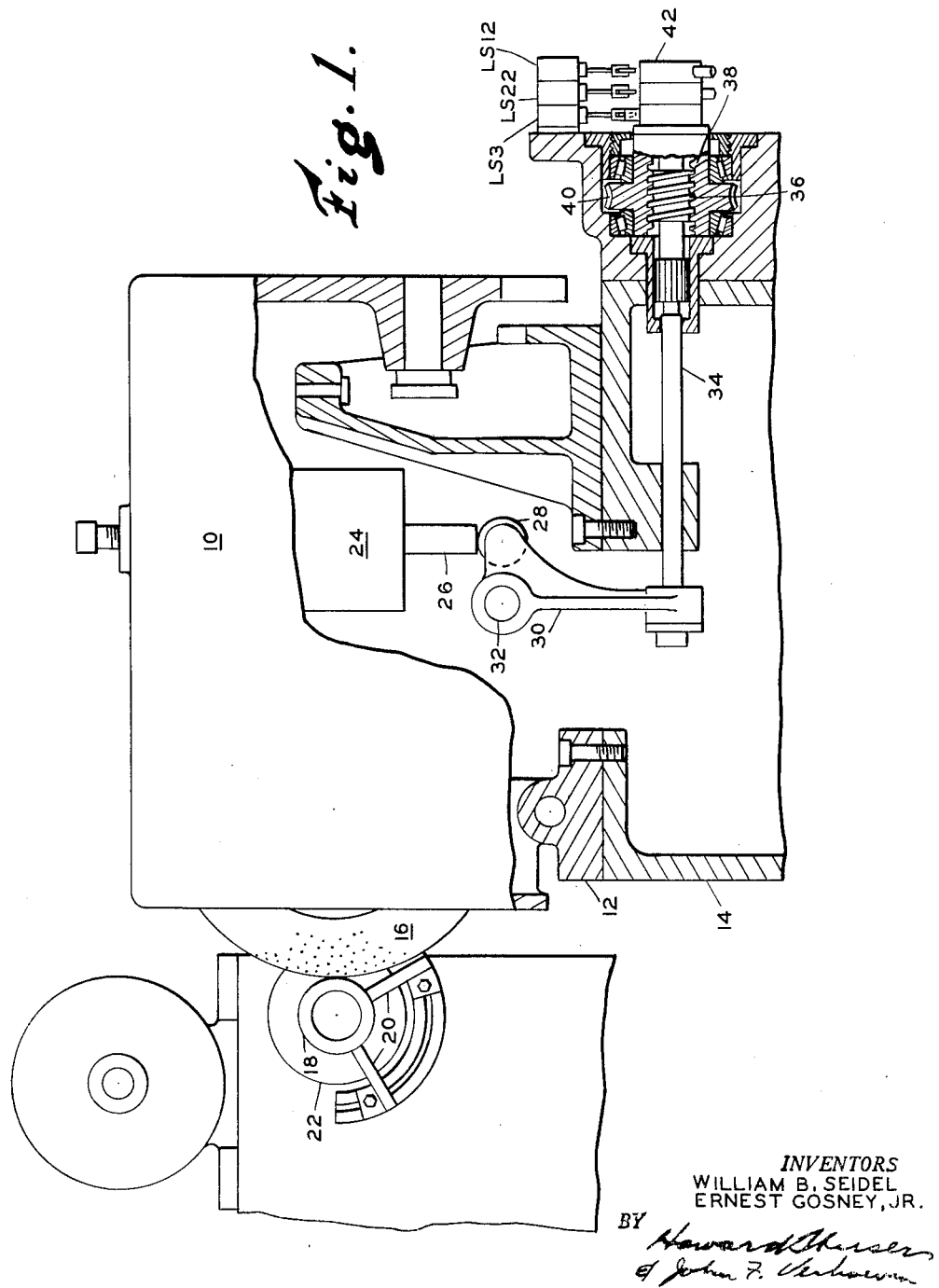
FIG. 1 is a view of a grinding machine wheelhead partly in section, showing the mechanical infeed producing members.

A grinding machine as described in this embodiment is of the rocking wheelhead type as shown in FIG. 1. The wheelhead 10 is pivotally received by the trunnion 12 on the machine base 14. The grinding wheel 16 carried by the wheel head is moved in an arc toward and away from a workpiece 18 supported in shoes 20 and rotated by the headstock 22 during a grinding cycle. Rapid wheel motion is produced by the selected lifting and lowering action of the rapid advance and retraction cylinder 24 in which a piston is received. The piston rod 26 of the piston is received against the heel 28 of feed lever 30 which prevents the piston from moving downward during rapid movement, forcing the wheelhead to move. Feed motion is produced by moving the feed lever which is pivotal about axle 32 fixed relative to the machine base. The lower end of the feed lever 30 is received over a feed shaft 34 which has a feed screw portion 36 received in the feed nut 38. The feed shaft 34 is connected to the lever 30 in a manner to control the angular position of lever 30 in accordance with the axial position of the shaft 34. The connection between the shaft 34 and the lever 30 is not rigid but allows for swinging movement of the lever 30 relative to the shaft 34 as the shaft 34 is moved axially during feed movement of the wheelhead 10. The feed nut has a worm wheel form on its outside diameter 40. The worm wheel 40 is engaged by a worm 41 (FIG. 2) which is rotated by the feed motor 56. As the feed nut 38 is turned, the feed shaft 34 moves axially. The axial movement swings the feed lever 30 and the heel portion 28 has a vertical component of movement which in one direction raises the wheelhead and in the other direction lowers the wheelhead. The raising motion is controlled to produce infeed movement while the lowering motion is used to restore the system to its initial condition in preparation for a succeeding feed cycle. Also received on the feed shaft 34 so as to rotate with the feed nut are disc cams 42 which are adapted to engage the limit switches LS3, LS22 and LS12. These limit switches perform control functions in the machine cycle operation.

Figure 2:
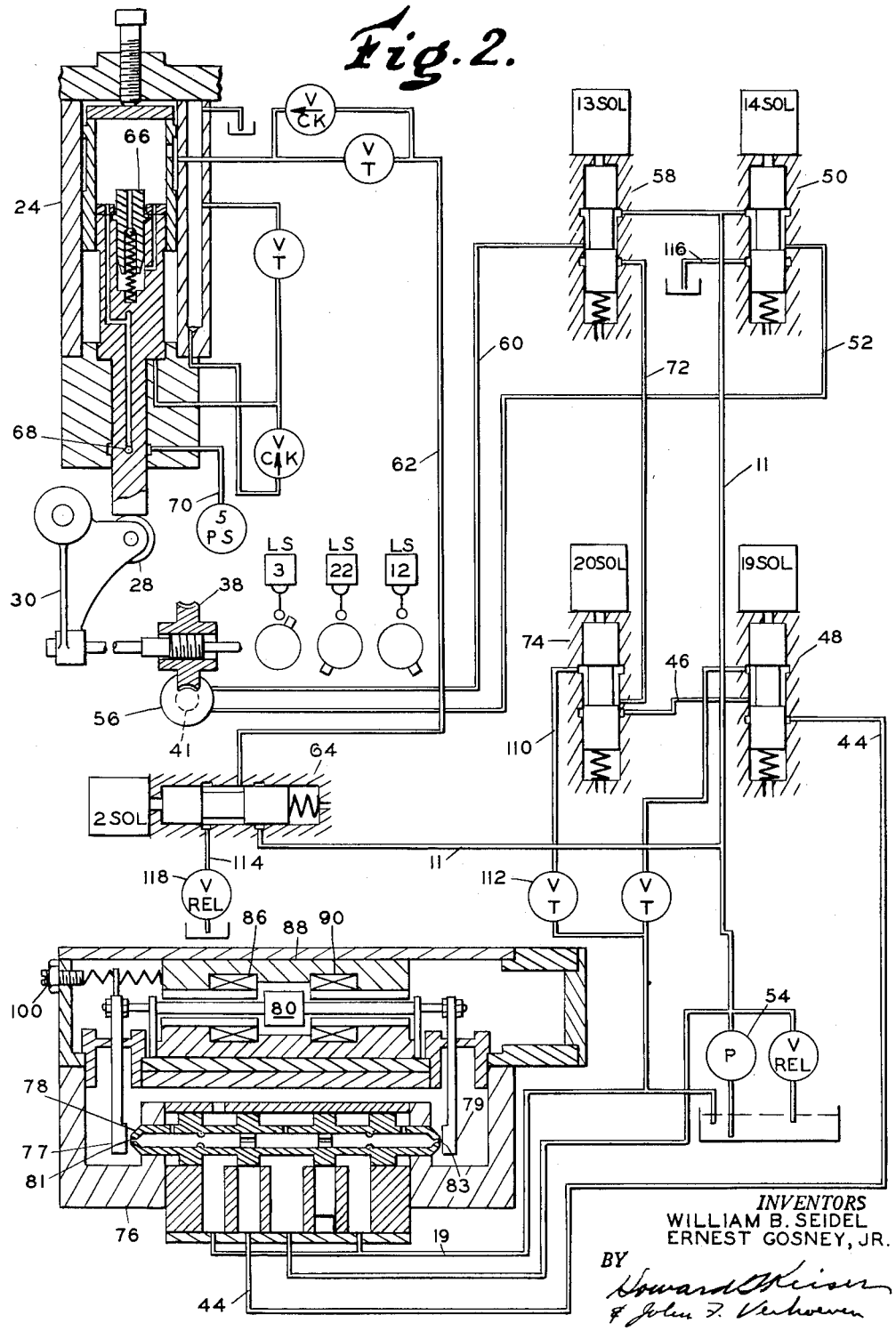
FIG. 2 is the hydraulic circuit of the infeed mechanism.
Figure 3:
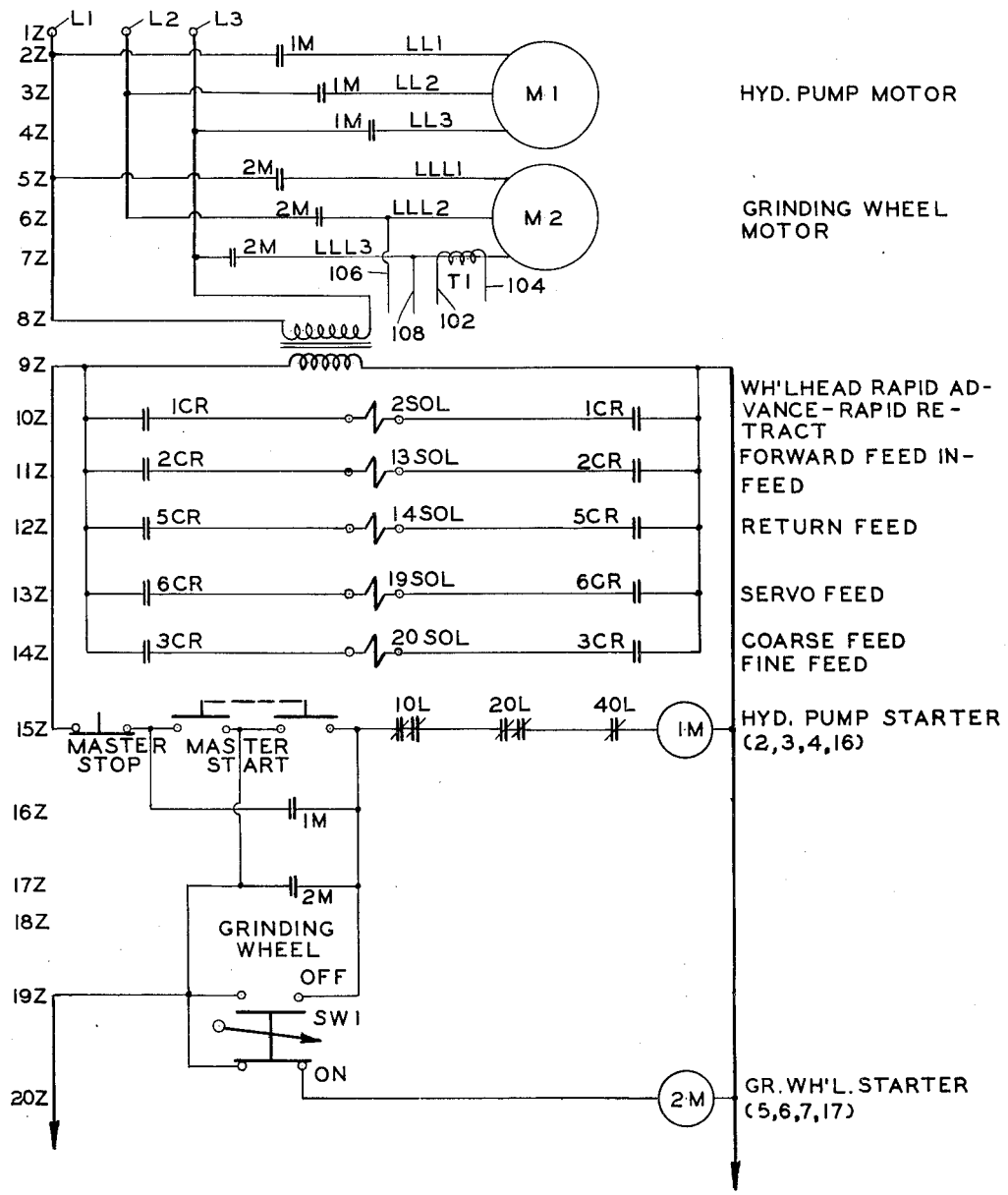
FIGS. 3 and 4 show the electrical control circuit for the infeed mechanism with reference line location numbers having the suffix "Z."
Figure 4:
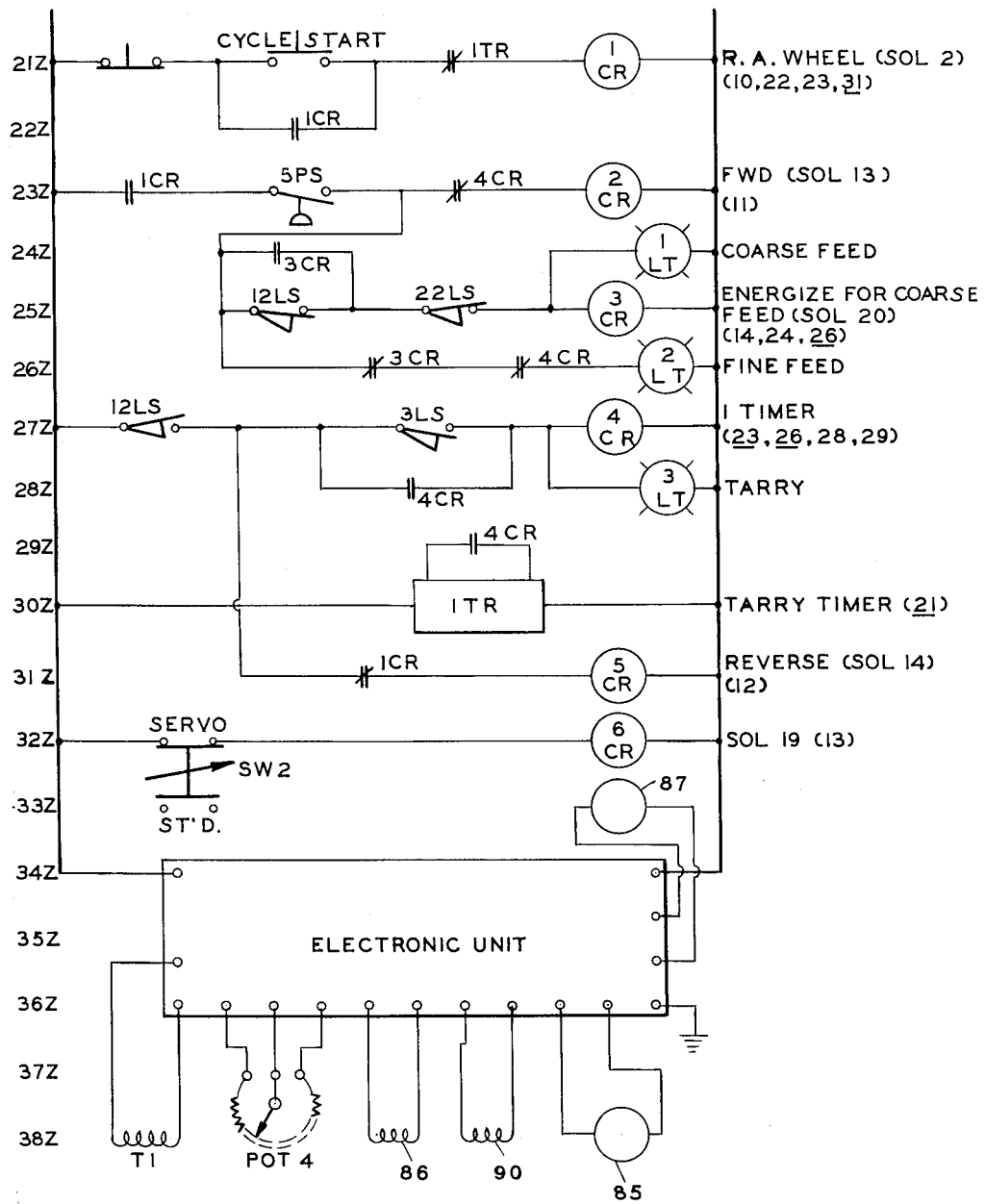

The machine cycle is described with reference made to FIGS. 2, 3 and 4. When reference is made to a component shown in FIGS. 3 and 4, the reference line location number will be given in parenthesis. Initially, the master start button (15Z) is depressed and the hydraulic pump motor M1 (3Z) is energized through the overload contacts 10L, 20L, 40L and through contacts of relay 1M. At the same time the grinding wheel motor M2 (6Z) is energized through contacts of relay 2M if the switch SW1 is in the "on" position. The servo select switch SW2 (32Z) is placed in the servo control position which causes relay 6CR (32Z) to be picked up. When relay 6CR picks up, solenoid 19SOL (13Z) is energized and hydraulic lines 44 and 46 are connected through the valve 48 (see FIG. 2). The reversing valve 50, at this time, is in the position shown and connects line 52 to line 11 which applies fluid under pressure from the source 54 to one side of the hydraulic feed motor 56. The feed valve 58 is also in the position shown, at this time, and fluid under pressure from the source is applied to the other side of the feed motor 56 through line 60. The result is an initial static condition of the feed motor 56.

The cycle start switch (21Z) is now depressed and relay

1CR (21Z) picks up and fires the rapid advance and retract solenoid 2SOL (10Z) which connects fluid lines 11 and 62 through the rapid approach valve 64. Line 11 is full pressure and this causes the rapid approach cylinder 24 to move upward relative to the piston 66 which is supported by the heel 28 of the feed lever 30. This swings the wheelhead rapidly toward the workpiece. At a predetermined point, pressure switch 5PS (23Z) is made by the mating of port 68 and line 70 and relay 2CR (23Z) is picked up to fire solenoid 13SOL (11Z) causing the feed valve 58 to connect lines 72 and 60. At the same time relay 2CR fires, relay 3CR (26Z) also picks up and solenoid 20SOL (14Z) fires, connecting lines 72 and 46 through valve 74. The course feed light 1LT (24Z) lights. The return path from the hydraulic motor is now completed to the servo valve 76 which functions as a rate valve to control the feed motor speed in accordance with the grinding wheel motor load through connection of an electro-magnetic winding to a load detecting and signal producing unit. This unit has been pre-set to bias the servo valve to the fully open position with plunger 78 shifted to the right from the position shown in FIG. 2 when the grinding wheel runs without contacting the workpiece, and line 44 is connected to return line 19. Until the workpiece is contacted, the valve 76 remains fully open and feed of the wheel toward the workpiece is very rapid. When the workpiece is engaged by the grinding wheel, the load signal producing the electro-magnetic force influencing the position of the core 80 in the servo control valve 76 changes. This change shifts the core 80 which is supported on leaf spring mountings for reciprocal movement in electromagnetic coils 86, 90 and swings the pivotal arms 77 and 79, each fixed at its upper end to an end of the core 80, to change the reaction forces resulting from escape of fluid from the orifices 81 and 83. Thus plunger 78 is shifted to the left to slow the feed motor speed. When the pressure between the wheel and workpiece develops a motor load that reaches a preset level or goes beyond that level the servo valve (shown as closed in FIG. 2) will completely block the feed motor and stop infeed to reduce the grinding pressure.

The operation of the servo valve in this system is best described with reference made to FIGS. 5 and 6 which show schematically the details of the electronic unit (35Z) of FIG. 4. FIG. 5 shows a grinding wheel load detecting circuit which is in essence a power meter of the bridge circuit type. It has two voltages tapped off, one from potentiometer POT1 and the other from potentiometer POT2, and coupled through resistances R9 and R10 and lines 82 and 84 respectively to the first stage tubes V3 and V4 of the parallel paths in the direct current amplifier of FIG. 6. One path of the amplifier is through the tubes V3, V5 and V7 and their connecting circuitry while the other path is through tubes V4, V6 and V8 and their connecting circuitry. The difference of electrical potential between the conducting lines 82 and 84 is a load signal which varies when the load on the grinding wheel motor varies. In initial machine adjustment before setup for any particular job, the output of the bridge circuit has been set by adjustment of the balance potentiometers POT1, POT2 and POT5 so that there is no difference in potential between the lines 82 and 84 when the grids of tubes V1 and V2 are not affected by the grinding wheel motor load as when resistor R1 is short circuited. At this same time, the resistor R18 in the circuit of first stage of the direct current amplifier shown in FIG. 6 is adjusted to balance the current through the first stage tubes V3 and V4 so that the plate current of the output tubes V7 and V8 is indicated as being balanced by the meter 85. A coil 86 (FIG. 2) of the control winding unit 88 of the servo valve is the plate load of the output tube V7 and is connected across the output terminals 92 and 94 (FIG. 6). A similar coil 90 of the servo valve control winding is the plate load of the output tube V8 and is connected across output terminals 96 and 98. When V7 and V8 conduct equally, the current in each of the coils is equal to the current in the other. Equal electro-magnetic forces are produced in the coils. The coils are so arranged that the polarity of each coil is in opposition to the polarity of the other. The core 80 (FIG. 2) feels equal and opposite forces and will not move. With the core in this condition the servo valve is adjusted for the just cut off situation shown in FIG. 2 by the adjusting screw 100 and no fluid flows in the return circuit from the feed motor 56. Therefore, when there is no difference between the currents through output tubes V7 and V8, the servo valve is adjusted to stop the feed motor and hold it stopped until a difference appears. This difference in current is effectively the load signal produced by the wheel load detecting or meter circuit of FIG. 5 and amplified by the circuit shown in FIG. 6.

In the control of the machine here described, the bias on the tubes V1 and V2 (FIG. 5) is varied by the current flow to the grinding wheel motor M2 through line LLL3 (FIG. 3) as applied against a reference voltage taken across lines LLL2 and LLL3. An increase in grinding wheel motor load causes the current in line LLL3 to increase proportionally. A current transformer T1 is inductively coupled to line LLL3 and induces a current in the lines 102 and 104 which flows through the resistor R1 (FIG. 5). The induced current through resistor R1 is directly proportional to the current in line LLL3 and is therefore proportional to the grinding wheel motor load. The potential difference across the resistor R1 is proportional to the induced current in the transformer T1 and is injected into the grid bias circuit of tubes V1 and V2. Also in the grid bias circuit of tubes V1 and V2 is the secondary of the transformer T2. This transformer T2 applies a reference voltage to that circuit proportional to the line voltage between LLL2 and LLL3. The voltage across the resistance R1 and the voltage induced in the secondary of the transformer T2 are phased such that in the grid of tube V1 the two voltages are felt as an alternating voltage whose amplitude is the sum of the two voltages. In the grid of tube V2, the two voltages are felt as an alternating voltage having an amplitude which is the difference between the two voltages. The effective voltage of an alternating current is equal to the maximum voltage divided by the square root of two. Consequently the effective bias on tube V1 is different from the effective bias on tube V2 and their relative resistance changes causing a change in balance of the bridge circuit in FIG. 5 which will be indicated by the load meter 87. The change from a balanced condition increases as the load increases. When the bridge circuit is unbalanced, a potential difference appears across lines 82 and 84 proportional to the load on motor M2 and this potential is applied as a load signal to the amplifier in FIG. 6 to produce a current difference in the plate circuits of the output tubes V7 and V8.

However, another adjustment of the bridge circuit is made in machine setup. The percent load potentiometer, POT4, is set to unbalance the bridge circuit and to produce a predetermined signal which is applied to the grids of the first amplifier stage when the grinding wheel motor runs without a load. The signal is operative to bias the control valve to the fully open position. This bias, holding the servo valve open, is set so that it is opposed by the unbalancing effect of the current induced in the current transformer T1 as the grinding wheel motor load increases. Therefore as the grinding wheel load increases, the unbalance created by action of tubes V1 and V2 opposes the preset bias unbalance set in by the percent load setting of potentiometer POT4. The unbalances cancel each other when the predetermined load is reached, and the feed motor stops. This relieves grinding pressure and reduces motor load. As motor load is reduced, the servo valve is caused to open and to allow the feed motor to run.

In machine operation then, at the end of rapid advance, the servo valve feels a low load condition and is in an open position. This allows the wheel to feed rapidly until contact between wheel and work is effected at which time wheel pressure begins to build up and the servo valve begins to close. If the preset motor load is reached or passed, the valve 76 closes completely and stops the feed motor. The pressure drops as a result of the feed motor stoppage. The pressure drop causes the valve to open again. There is an initial tendency to oscillate slightly between open and closed positions but this tendency is damped sufficiently by the unavoidable inherent qualities of electro-hydraulic and mechanical systems and the core in the servo valve winding will assume a position from which it will move in one direction or the other in response to a change in wheel motor load to shift the valve plunger to produce a substantially constant grinding wheel motor load. The grinding wheel sharpness will vary during the grinding cycles. The sharpness affects the cutting action that produces the grinding pressure. Since this system produces a substantially constant pressure, the feed rate will vary in accordance with the wheel sharpness.

Returning to FIGS. 2, 3 and 4 in the described cycle, the servo valve remains in control until the disc cams trip limit switch LS22 and cause relay 3CR (25Z) to drop and remove control voltage from solenoid 20SOL. This causes the feed valve 74 to connect lines 72 and 110. The servo valve 76 is taken out of the circuit and feed is now controlled by the fine feed rate valve 112 for a brief period and is indicated by the lighting of the fine feed light 2LT (26Z). At a preset point shortly after this fine feed is initiated, limit switch LS3 is made and relay 4CR (27Z) picks up and starts the tarry timer 1TR (30Z) and lights indicator light 3LT (28Z). At the same time that relay 4CR is picked up, relay 2CR (23Z) is dropped and solenoid 13SOL (11Z) is de-energized to stop the feed motor 56. The wheelhead remains stationary until the end of the period determined by the setting of timer 1TR. At that time, relay 1CR (21Z) is dropped, solenoid 2SOL is de-energized and the rapid approach valve 64 shifts to connect lines 62 and 114 which allows the fluid to escape cylinder 24. The wheelhead then rapidly retracts from the workpiece. At the same time that relay 4CR is picked up causing relay 1CR to drop, relay 5CR (31Z) picks up and solenoid 14SOL fires. This connects lines 52 and 116 through the return feed valve 50 and since the feed valve 58 has connected lines 11 and 60 when relay 2CR was dropped, the feed motor reverses and runs until the system returns to its initial condition at which time limit switch LS12 is made and relay 5CR (31Z) drops out. Then pressure is applied to both sides of the feed motor as solenoid 14SOL is de-energized causing the return feed valve 50 to connect line 52 to line 11 which is full pressure. The infeed system is now static in its initial position and ready for another cycle since pressure is in both lines 52 and 60, and line 62 is open to the reservoir through the low pressure relief valve 118.

The portion of the feed cycle controlled by the servo valve is characterized by a variable feed rate dependent upon the preset grinding wheel motor load which is directly proportional to the pressure between the grinding wheel and the workpiece rather than by a constant feed rate. The result is that less time is consumed in the sharp wheel cycle conditions since the pressure then will not be as great for a given feed and a faster feed is allowed. Nor is the quality of the finished product affected by excessive feed rates during dull wheel conditions since the wheel pressures would increase for a given feed rate causing the feed rate to be slowed accordingly.

What is claimed is:

1. In a grinding machine having a grinding wheel rotated by an electric motor, said wheel movable into abrasive contact with a workpiece by a fluid motor driven infeed mechanism, said contact generating a grinding pressure in accordance with grinding conditions including the infeed rate, said grinding pressure producing a load on the electric motor corresponding thereto, a control system operable to maintain a selected grinding pressure comprising in combination an electrical motor load detecting means having an electrical output varying with the motor load, a rate valve having fluid lines in communication with the fluid motor and having an electromagnetic core operable in response to electromagnetic forces acting thereon to control the fluid flow through said valve, means to establish a biasing electromagnetic force on the core, means operable to produce an opposing electromagnetic force on said core in response to said electrical output to instantaneously decrease and increase the flow of fluid to said fluid motor, respectively, when the grinding pressure is above and below said selected grinding pressure, and means to adjust one of said forces on the core to alter the selected grinding pressure.

2. In a grinding machine having a grinding wheel driven by a constant speed electric motor, said wheel movable into abrasive contact with a workpiece by a hydraulic motor driven infeed mechanism, said contact generating a grinding pressure in accordance with grinding conditions including the infeed rate, the load on the electric motor varying in accordance with the grinding pressure, and a predetermined grinding pressure producing a predetermined load on the motor, a control system comprising in combination a meter means having an output potential varying with the electric motor load, a direct current amplifier having two parallel amplifying circuits connected across said output potential and having an amplified current output difference proportional to said meter output, an electromagnetic winding having two electromagnetically opposed coils connected, respectively, to the amplifier outputs, a core movable in response to the current difference in the coils for movement in one direction when the motor load exceeds said predetermined load and for movement in the opposite direction when the motor load is less than said predetermined load, a rate valve having means communicating with the hydraulic motor establishing a flow of fluid through said hydraulic motor, said flow producing movement of the motor to drive the infeed mechanism, a plunger slidably received in said valve defining a variable restriction movable in response to movement of the core in said one direction to decrease fluid flow to the motor and reversely movable in response to movement of the core in said opposite direction to increase fluid flow to the motor, thereby regulating the infeed rate to maintain said predetermined grinding pressure, and means to adjust the output potential of said meter means to adjust the current in one of said coils relative to the other coil to selectively change said predetermined pressure.

3. In a grinding machine having a grinding wheel driven by a constant speed electric motor, said wheel movable into abrasive contact with a workpiece by a hydraulic motor driven infeed mechanism, said contact generating a grinding pressure in accordance with grinding conditions including the infeed rate, the load on the infeed motor varying in accordance with the grinding pressure, and a predetermined grinding pressure producing a predetermined load on the motor, a control system comprising in combination, meter means connected with the electric motor to produce an output potential varying with the electric motor load, means to bias the output potential of said meter means whereby said output potential is zero when said electric motor load is equal to said predetermined load electrical means connected in circuit with said meter means and having two electrical output signals having a difference in proportion to said output potential, a rate valve having fluid lines in communication with the fluid motor and having a plunger operable in response to a force differential acting thereon to control the fluid flow through said valve, and means responsive to a difference between said two electrical signals to produce a force differential on said plunger for movement thereof proportional to the difference between said two electrical signals to smoothly increase and decrease the speed of said hydraulic motor and maintain said predetermined load on said electric motor.

4. In a grinding machine having a grinding wheel driven by a constant speed electric motor, said wheel movable into abrasive contact with a workpiece by a hydraulic motor driven infeed mechanism, said contact generating a grinding pressure in accordance with grinding conditions including the infeed rate, the load on the electric motor varying in accordance with the grinding pressure, and a predetermined grinding pressure producing a predetermined load on the motor, a control system comprising in combination, an electrical motor load detecting means connected with the electric motor and having an electrical output varied by the amount of load on said electric motor, means to produce two electrical signals having a difference therebetween proportional to the output of said detecting means, a rate valve having fluid lines in communication with the fluid motor and having a plunger operable in response to a force differential acting thereon to control the fluid flow through said valve, and means responsive to the difference between said two electrical signals to produce a force differential on said plunger for movement thereof an amount proportional to the difference between said two electrical signals whereby the speed of said hydraulic motor is smoothly increased and decreased to maintain said predetermined load on said electric motor.

References Cited in the file of this patent

UNITED STATES PATENTS

| | | |
|---|---|---|
| 2,129,049 | Doran | Sept. 6, 1938 |
| 2,168,596 | Hall | Aug. 8, 1939 |
| 2,478,562 | Binns et al. | Aug. 9, 1949 |
| 2,961,808 | Dunigan | Nov. 29, 1960 |

FOREIGN PATENTS

| | | |
|---|---|---|
| 782,432 | Great Britain | Sept. 4, 1957 |